US010332200B1

(12) United States Patent
Fournier et al.

(10) Patent No.: US 10,332,200 B1
(45) Date of Patent: Jun. 25, 2019

(54) DUAL-USE DISPLAY SCREEN FOR FINANCIAL SERVICES APPLICATIONS (71) Applicant: Wells Fargo Bank, N.A., San Francisco, CA (US)

(72) Inventors: Andrew James Fournier, Chandler, AZ (US); Kourtney Eidam, Marietta, GA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 611 days.

(21) Appl. No.: 14/588,660

(22) Filed: Jan. 2, 2015

Related U.S. Application Data (60) Provisional application No. 61/954,343, filed on Mar. 17, 2014.

(51) Int. Cl.
G06Q 40/00 (2012.01)

(52) U.S. Cl.
CPC .................. G06Q 40/00 (2013.01)

(58) Field of Classification Search
CPC ......... G06Q 30/02; G06Q 30/06; G06Q 40/02
See application file for complete search history.

(56) References Cited

U.S. PATENT DOCUMENTS

| 6,020,891 A | 2/2000 | Rekimoto | |
| 7,069,516 B2 | 6/2006 | Rekimoto | |
| 7,117,452 B1* | 10/2006 | Pavelski | G06F 9/4443 715/762 |
| 7,167,142 B2 | 1/2007 | Buckley et al. | |
| 8,386,956 B2* | 2/2013 | Ording | G06F 3/0481 715/788 |
| 8,438,110 B2 | 5/2013 | Calman et al. | |
| 2006/0115130 A1 | 6/2006 | Kozlay | |
| 2006/0183505 A1* | 8/2006 | Willrich | G06F 1/1616 455/566 |
| 2008/0062625 A1* | 3/2008 | Batio | G06F 1/1615 361/679.29 |
| 2008/0134013 A1* | 6/2008 | Audet | G06F 17/2205 715/201 |
| 2008/0159305 A1 | 7/2008 | Morris et al. | |

(Continued)

FOREIGN PATENT DOCUMENTS

WO 20071063306 A2 6/2007

OTHER PUBLICATIONS

Jean-François Rouet et al., "Summarizing Digital Documents: Effects of Alternate or Simultaneous Window Display," Applied Cognitive Psychology (May 2008).*

(Continued)

Primary Examiner — Virpi H Kanervo
(74) Attorney, Agent, or Firm — Merchant & Gould P.C.

(57) ABSTRACT

A method includes displaying a financial services document on a display screen of an electronic computing device. The financial services document is displayed on a first section of the display screen and on a second section of the display screen. An action is performed on the financial services document on the first section of the display screen without changing the display of the financial services document on the second section of the display screen. An action is performed on the financial services document on the second section of the display screen without changing the display of the financial services document on the first section of the display screen.

20 Claims, 8 Drawing Sheets

(56) References Cited

U.S. PATENT DOCUMENTS

| | | | |
|---|---|---|---|
| 2010/0005519 A1 | 1/2010 | Lim | |
| 2010/0293501 A1* | 11/2010 | Russ | G06F 3/04886 715/803 |
| 2011/0285829 A1 | 11/2011 | Mori et al. | |
| 2012/0231424 A1 | 9/2012 | Calman et al. | |
| 2012/0231814 A1 | 9/2012 | Calman et al. | |
| 2012/0232937 A1 | 9/2012 | Calman et al. | |
| 2012/0232966 A1 | 9/2012 | Calman et al. | |
| 2012/0232968 A1 | 9/2012 | Calman et al. | |
| 2012/0232976 A1 | 9/2012 | Calman et al. | |
| 2012/0232977 A1 | 9/2012 | Calman et al. | |
| 2012/0233015 A1 | 9/2012 | Calman et al. | |
| 2012/0233032 A1 | 9/2012 | Calman et al. | |
| 2012/0233072 A1 | 9/2012 | Calman et al. | |
| 2013/0033522 A1 | 2/2013 | Calman et al. | |
| 2014/0006921 A1* | 1/2014 | Gopinath | G06F 17/241 715/230 |
| 2014/0164772 A1* | 6/2014 | Forte | G06F 21/6209 713/171 |
| 2015/0380804 A1* | 12/2015 | Lim | G06F 1/162 343/702 |

OTHER PUBLICATIONS

Hinckley et al., "Codex: A Dual Screen Tablet Computer," CHI 2009—New Mobile Interactions, Boston, MA, pp. 1933-1942 (Apr. 2009).*

Chen, "Navigation Techniques for Dual-Display E-book Readers," CHI 2008—Finding Your Way, Florence, Italy, pp. 1779-1788 (Apr. 2008).*

U.S. Appl. No. 14/339,971, filed Jul. 24, 2014 entitled "Collaborative Document Creation ".

Forte, Andrea G. et al., "EyeDecrypt—Private Interactions in Plain Sight," http://eprint.iacr.org/2013/590.pdf, Proc. 9th Conference on Security and Cryptography for Networks, 2013, 19 pages.

Rekimoto, Jun et al., "Augmented Surfaces: A Spatially Continuous Work Space for Hybrid Computing Environments," https://www.sonycsl.co.jp/person/rekimoto/papers/chi99.pdf, 1999, 8 pages.

Almo, "2013 Interactive Buying Guide," http://www.almoproav.com/Resources/BuyingGuides/Interactive/assets/InteractiveBG_2013.pdf, 2013, 29 pages.

Miller, Paul, "Google Glass apps: everything you can do right now," http://www.theverge.com/2013/5/20/4339446/google-glass-apps-everything-you-can-do-right-now, May 20, 2013, 20 pages.

Möllers, Max et al., "TaPS Widgets: Interacting with Tangible Private Spaces," http://hci.rwth-aachen.de/materials/publications/moellers2011a.pdf, Copyright 2011, 4 pages.

Olwal, Alex et al., "ASTOR: An Autostereoscopic Optical See-through Augmented Reality System," http://cs.iupui.edu/~tuceryan/pdf-repository/Olwal2005.pdf, Oct. 2005, 4 pages.

Rekimoto, Jun et al., "Perceptual Surfaces: Towards a Human and Object Sensitive Interactive Display," http://mrl.nyu.edu/~perlin/courses/spring2006/shadowwalls/pui97[1].pdf, 1997, 3 pages.

Robinson, John et al., "The LivePaper System: Augmenting Paper on an Enhanced Tabletop," 2001, 23 pages.

* cited by examiner

DUAL-USE DISPLAY SCREEN FOR FINANCIAL SERVICES APPLICATIONS

BACKGROUND

Financial institutions provide a variety of services to customers. Example services include banking accounts, loans, mortgages, brokerage accounts, etc. When a customer applies for a financial service, the customer typically meets face to face with a financial services employee and may need to fill out one or more forms.

Forms that a customer may need to fill out for a financial service typically require the customer to enter personal information such as name, address, date of birth, information about financial assets the customer may have, etc. The customer may also be required to provide confidential information such as a social security number and a personal identification number (PIN). When providing the personal information, the customer may have privacy concerns and may not want the personal information to be seen by others.

SUMMARY

Embodiments of the disclosure are directed to a method implemented on a display screen of an electronic computing device, the method comprising: displaying, by the electronic computing device, a financial services document on a first section of the display screen and on a second section of the display screen; performing an action on the financial services document on the first section of the display screen without changing the display of the financial services document on the second section of the display screen; and performing an action on the financial services document on the second section of the display screen without changing the display of the financial services document on the first section of the display screen.

In another aspect, a method implemented on a display screen of an electronic computing device comprises: displaying, by the electronic computing device, a financial services document on a first section of the display screen and on a second section of the display screen, the display of the financial services document on the second section of the display screen being at a different orientation than the display of the financial services document on the first section of the display screen; displaying a keyboard on the second section of the display screen of the electronic computing device; while the keyboard is displayed on the display screen of the electronic computing device, displaying the keyboard on a display screen of an augmented reality (AR) device; receiving entries from the keyboard; and displaying the entries from the keyboard on the AR device, wherein the entries from the keyboard are not displayed on the electronic computing device.

In yet another aspect, an electronic computing device comprises: a processing unit; and system memory, the system memory including instructions which, when executed by the processing unit, cause the electronic computing device to: display a financial services document on a first section of a display screen of the electronic computing device and on a second section of the display screen of the electronic computing device, the display of the financial services document on the second section of the display screen being at an orientation of 180 degrees from the display of the financial services document on the first section of the display screen, the first section of the display screen and the second section of the display screen each comprising one half of the display screen; scroll the financial services document on the first section of the display screen without changing the display of the financial services document on the second section of the display screen; scroll the financial services document on the second section of the display screen without changing the display of the financial document on the first section of the display screen; and scroll the financial services document on either the first section of the display screen or the second section of the display screen or on both first section of the display screen and the second section of the display section of the display screen so that a display of the financial services document on the first section of the display screen is different than a display of the financial services document on the second section of the display screen.

The details of one or more techniques are set forth in the accompanying drawings and the description below. Other features, objects, and advantages of these techniques will be apparent from the description, drawings, and claims.

DETAILED DESCRIPTION

The present disclosure is directed to systems and methods for using dual-use display screens for financial services applications. As defined in this disclosure, a dual-use display screen is an electronic display screen that is configured for use by both a financial services employee and a consumer of financial services. In an example implementation, the display screen is split into two sections. Each section of the display screen may have independently displayed views, for example one view for the financial services employee and the other view for the consumer of the financial services. In addition, in a multi-use implementation, more than one person may view each section of the display screen. For example, a husband and wife may both simultaneously view the section oriented to the consumer of the financial services.

Financial institutions may provide a variety of services and may have different types of documents to support these services. Some example documents types include application forms for opening a checking account, applying for a loan, applying for a mortgage, opening a brokerage account, initiating a wire transfer, etc. Other document types are possible. The dual-use display screen provides an enhanced functionality for displaying these documents. The documents may be displayed in different ways so that each of two parties (the financial services representative and the consumer of the financial services) sees the most relevant information and can more easily input information. For example, a section of a document requiring a customer to enter personal information may be displayed to the customer but not displayed to a banker. Other examples of how the dual-use display screen provides this enhanced functionality are described later herein. In this disclosure, the financial services representative is referred to as the banker and the consumer of financial services is referred to as the customer. However, the financial services representative may perform other financial services than banking.

By having a dual-use display screen, the banker and the customer may view the same or different portions of the same document simultaneously. In addition, the customer may enter personal or other information directly into a form without needing to verbally tell the banker this information in order for the banker to enter it. Permitting the customer to enter the personal or other information directly into the form provides privacy for the customer and protects the confidentiality of the information. In addition, having a dual-use screen permits compliance with regulatory constraints that may prevent the display of certain types of information to a financial services employee or a customer, for example social security and/or pin numbers.

In an example implementation, the dual-use display screen may be oriented horizontally on a table. The banker may sit at one side of the table, facing one side of the dual-use display screen and the customer may sit at another side of the table, facing an opposite side of the dual-use display screen, at an orientation approximately 180 degrees from the banker. As discussed in more detail herein, the banker and the customer may simultaneously view the same document, different documents or different portions of the same document. In some implementations, the documents may be at the same orientation for the banker and the customer; for example the banker and the customer may sit side by side or the customer may be standing behind the banker.

The display screen is typically a touch screen. The banker and customer may scroll a document on the display screen by moving the document up or down with their fingers. Each side of the display screen may include a virtual keyboard and a virtual signature block. The virtual keyboard may appear on the display screen when the banker or the customer needs to enter alphanumeric data on the document. The signature block permits the banker or the customer to sign the document. In some implementations, an electronic signature may be used. The electronic signature may be entered via the virtual keyboard. In other implementations, a written signature may be used. The banker or the customer may enter the written signature via their fingers or via a writing device, such as a stylus.

To enhance privacy, an augmented reality (AR) device may be used with the example system 100. As explained in more detail later herein, the AR device may permit the customer to enter personal information with more privacy than if an AR device was not used. For example, when the customer enters personal information using the virtual keyboard on the dual-use display screen, the information entered may be displayed on a display screen of the AR device but not on a display screen of the virtual keyboard on the dual-use display screen. Anyone other than the customer viewing the display screen of the virtual keyboard on the dual-use display screen would see a blank screen.

Figure 1:
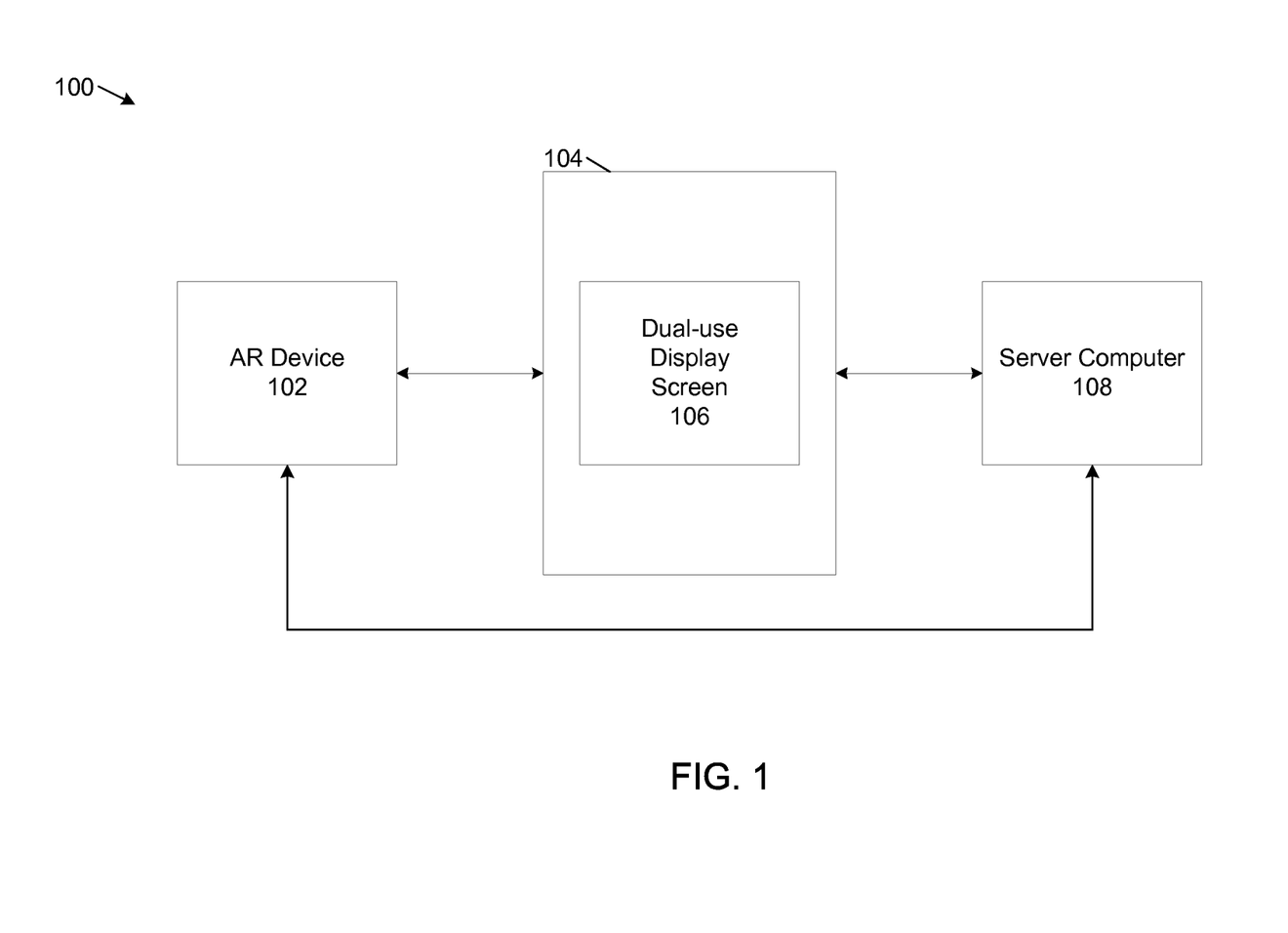
FIG. 1 shows an example system that supports a dual-use display screen for banking applications.

FIG. 1 shows an example system 100 that supports a dual-use display screen for banking applications. The system 100 includes an AR device 102, a client computer 104 and a server computer 108. The client computer 104 includes a dual-use display screen 106.

The example AR device 102 is an electronic device with augmented reality capabilities. Augmented reality is a technology in which a person's perception of reality can be enhanced, typically through augmented sound, video or graphics displays. The augmentation is typically implemented via a headset that may be worn by the person. One or more augmented views may be presented to the person through the headset.

The augmented reality headset typically includes a wearable computer and an optical display mounted to the headset. The wearable computer may include a wireless telecommunication capability, permitting a wireless connection from the wearable computer to a server computer. In some implementations, the server computer may be server computer 108. In other implementations, the server computer 108 may be another server computer, not shown in FIG. 1. Because of the wireless telecommunication capability, the augmented reality headset may be used to interact with the server computer to accomplish various tasks.

One type of AR headset described in this disclosure is a smart glass type of headset, similar to eyeglasses, which may be worn by the user. The user may view AR images in the glass portion of the headset. An example of a smart glass headset is Google Glass, from Google Inc. of Mountain View, Calif.

The example client computer 104 is a client computer in a banker's office or in a meeting room in a bank or offices of a financial institution. Other locations may be used. The client computer 104 includes the dual-use display screen 106.

The example dual-use display screen 106 is a flat screen display that is horizontally mounted on a table in the banker's office or meeting room of the bank or the financial institution. The dual-use display screen 106 is one physical display screen that is divided into two sections via software, so that one section of the display screen, typically one half of the display screen, is oriented to the banker and the other section of the display screen is oriented to the customer.

The server computer 108 is a server computer associated with the bank or financial institution. A connection is made between the client computer 104 and the server computer 108. In some implementations, the connection is a hard-wired connection. In other implementations, the connection is a wireless connection. The connection permits documents and other data from the server computer 108 to be displayed on the dual-use display screen 106.

Figure 2:
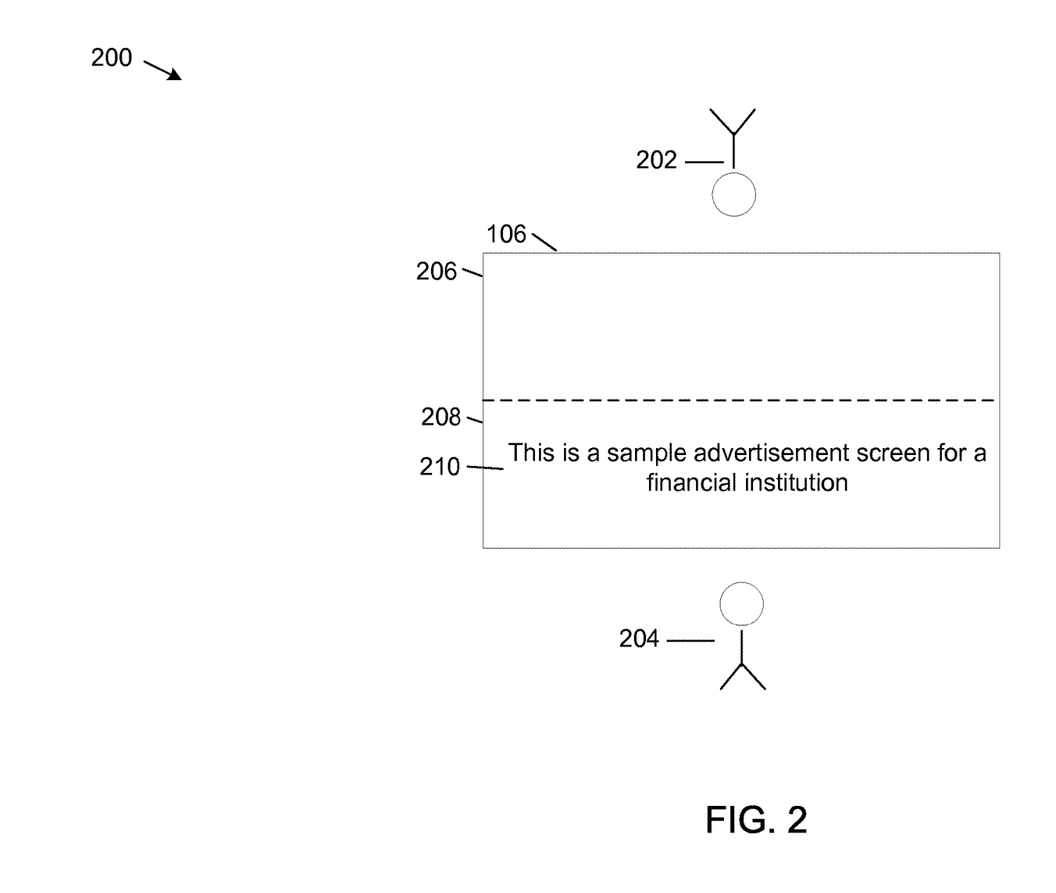
FIG. 2 shows a display scenario for the dual-use display screen of FIG. 1.

FIG. 2 shows an example display scenario 200 for the dual-use display screen 106. The example display scenario 200 may occur when a customer first enters the banker's office. As shown in FIG. 2, a banker 202 is oriented on one side 206 of the dual-use display screen 106 and a customer 204 is oriented on another side 208 of the dual-use display screen 106, facing the banker 202. In the example display scenario 200, the banker's side 206 of the dual-use display screen 106 is blank and the customer's side 208 of the dual-use display screen 106 displays advertisements 210. The example advertisements 210 may include promotional information for the bank, including promotional offers and information about banking products. The customer 204 may view the advertisements 210 while the banker 202 is preparing to meet with the customer 204.

Figure 3:
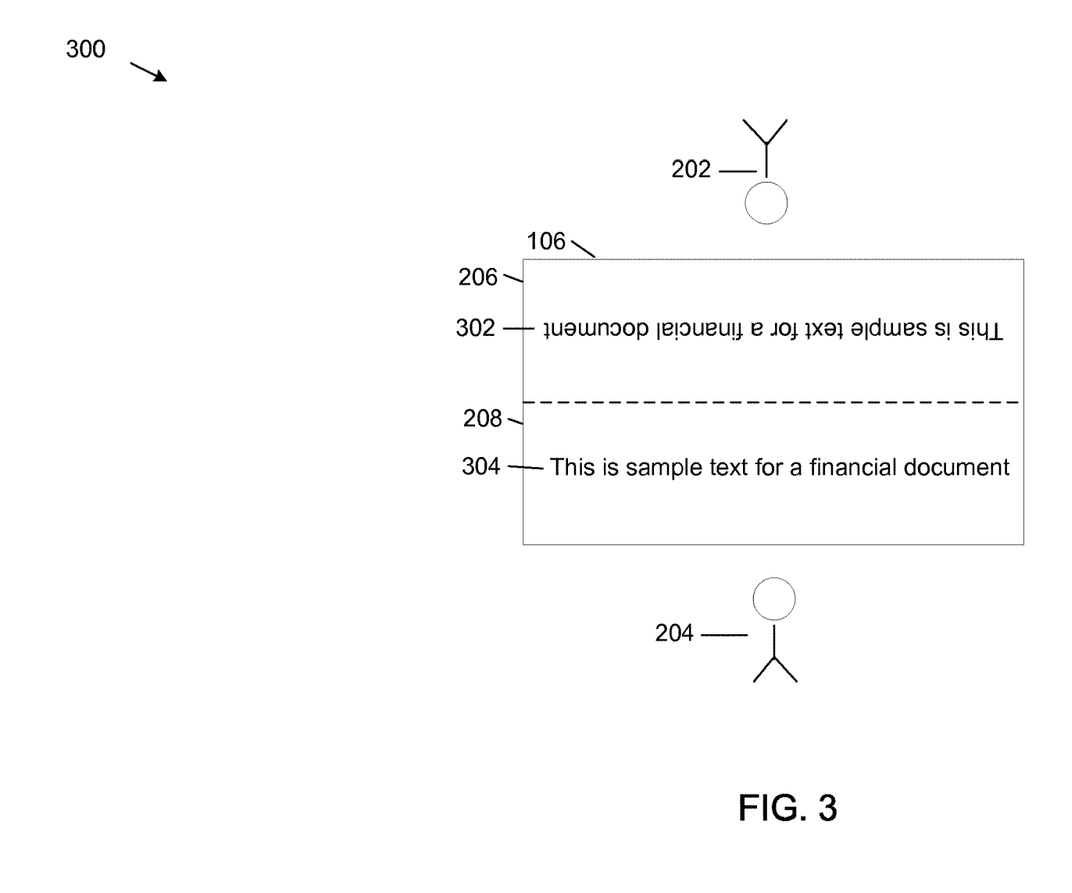
FIG. 3 shows another display scenario for the dual-use display screen of FIG. 1.

FIG. 3 shows an example display scenario 300 for the dual-use display screen 106. The example display scenario 300 occurs when the banker 202 presents a document to the customer 204. The banker views a portion 302 of the document in section 206 of the dual-use display screen 106 and the customer views a portion 304 of the document in section 208 of the dual-use display screen 106. In the example display scenario 300, the portion 302 of the document that the banker 202 views and the portion 304 of the document that the customer 204 views are identical. For example, the portions 302 and 304 of the document may correspond to the beginning of the document and may be viewed when the document is open.

As shown in FIG. 3, the text of the portion 302 of the document is oriented towards the banker 202 and the text of the portion 304 of the document is oriented towards the customer 204. The text of the portion 302 is oriented 180 degrees from the text of the portion 304. In other display scenarios, other orientations are possible.

The portions 302, 304 of the document are displayed independently of each other. For example, the banker 202 may scroll the document in section 206 while the portion 304 of the document remains displayed to the customer 204. Similarly, the customer may scroll the document in section 208 while the portion 304 of the document or some other portion of the document remains displayed to the banker 202. Typically, the document is scrolled using the fingers of a hand, in a similar manner to the way a document or text is scrolled on a smart telephone or a tablet computer.

In some implementations, when a document is opened in section 206, the document is automatically opened in section 208 and the portions 302 and 304 of the document being displayed in section 206 and section 208 are identical. In other implementations, the document is only opened in section 206. In this implementation, the banker 202 may slide or pass the document to section 208 using the fingers of the banker 202 on the display screen 106. The banker 202 physically moves the document over to section 208 by pushing the document image towards section 208 until the document is displayed in section 208. Typically, when the banker 202 pushes the document towards section 208, the document still remains displayed in section 206. In some implementations, when the banker 202 pushes the document towards section 208, the document is no longer displayed in section 206.

Typically, when the banker 202 pushes the document towards section 208, the portion 302 of the document that is displayed in section 206 remains displayed as portion 304 in section 208. For example, the banker 202 may scroll the document in section 206 until portion 302 displays a signature block for the customer 204. When the banker slides the document over to section 208, the signature block is displayed in section 208. Once the signature block is displayed in section 208, the banker 202 may scroll the document in section 206 without changing the display of the signature block in section 208. Similarly, the user may scroll the document in section 208, moving the signature block up or down, without having any effect on the display of the document in section 206.

Figure 4:
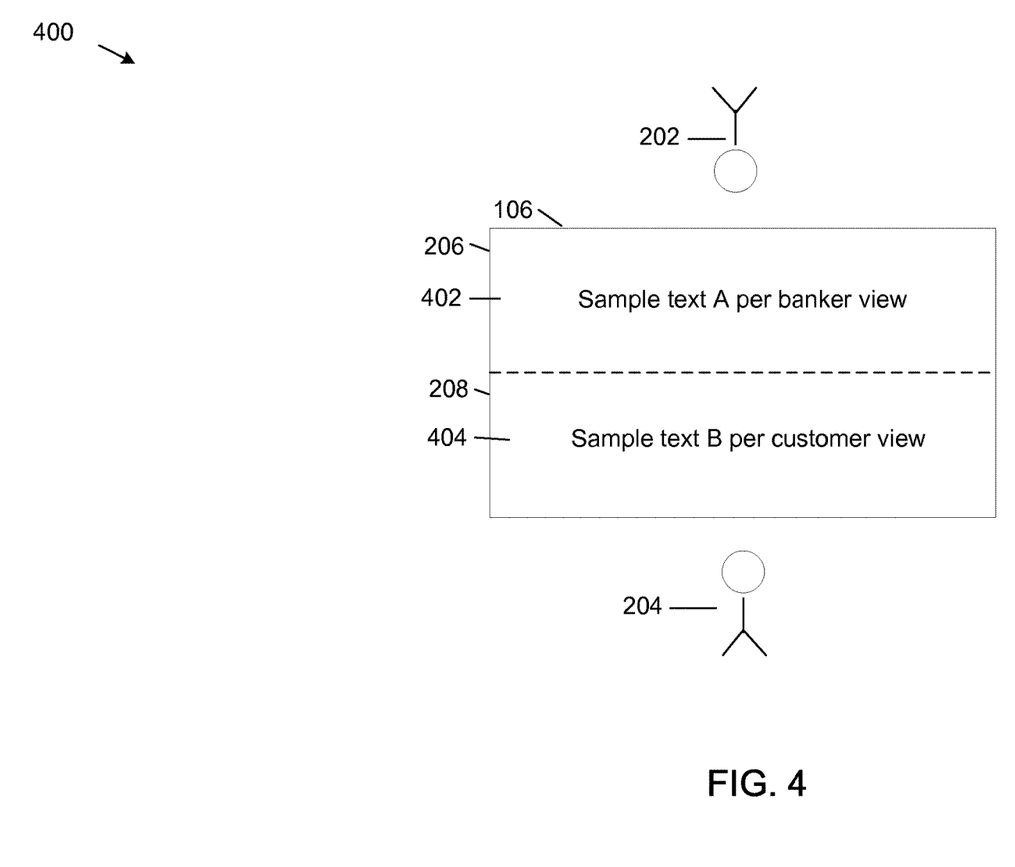
FIG. 4 shows yet another display scenario for the dual-use display screen of FIG. 1.

FIG. 4 shows an example display scenario 400 for the dual-use display screen 106. The example display scenario 400 occurs during a session between the banker 202 and the customer 204. The session may be directed to a specific banking service that the customer 204 is interested in, such as opening a mortgage or taking out a loan. During the session, a portion 402 of a document may be displayed in section 206 of the dual-use display screen 106 and a portion 404 of the document may be displayed in section 208 of the dual-use display screen 106. The sample text A shown as the portion 402 of FIG. 4 is actually rotated 180 degrees and oriented towards the banker 202.

During the session, the customer 204 may be required to fill out a form and enter personal information into the form. In the example display scenario 400, the sample text B shown as the portion 404 of FIG. 4 corresponds to the form the customer 204 is required to fill out. When the customer 204 is required to enter personal or other information into a text box on the form, typically when the customer selects the textbox, for example by pressing on the text box, a virtual keyboard (not shown in FIG. 4) is displayed in section 208 of the dual-use display screen 106. The user may enter the personal or other information directly into the form without verbally or otherwise communicating this information to the banker 202. In some implementations, the text in section 208 may be angled towards the user to provide more privacy for the user.

In a similar manner to entering personal or other information into the virtual keyboard, the customer 204 is typically required to sign the form. Typically, the customer 204 scrolls the document to where a signature box is displayed in section 208. In some implementations, the banker 202 may locate the signature box on the document, display the signature box in section 206 and slide the document with the signature box displayed to section 208. When the document with the signature box displayed is moved to section 208, the portion of the document that is moved to section 208 replaces any portion of the document displayed in section 208.

When the customer 204 selects the signature box, typically by pressing the signature box, the customer 204 is permitted to sign the signature box. In some implementations, an electronic signature is permitted. In this case, when the customer presses the signature box, a virtual keyboard is displayed, permitting the customer 204 to enter an electronic signature. In other implementations, a written signature is required. The user may sign with a finger or with a stylus.

Figure 5:
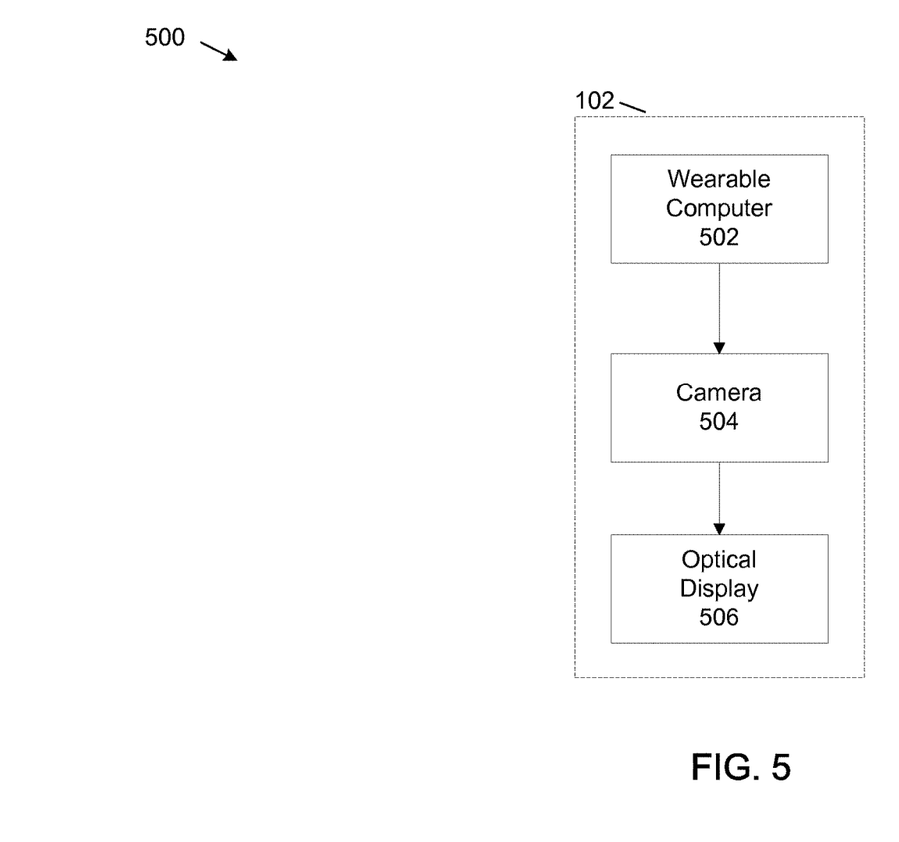
FIG. 5 shows example modules of the AR device of FIG. 1.

FIG. 5 shows example modules of AR device 102. In this example the AR device 102 is an AR headset, for example Google Glass. The AR headset includes a wearable computer 502, a camera 504, and an optical display 506. The wearable computer 502 includes a wireless telecommunication capability, permitting a wireless connection between the wearable computer and one or more server computers. The wireless capability may include Bluetooth, radio frequency identification (RFID) or similar types of wireless capability. The wearable computer 502 may also include optical character recognition (OCR). The wearable computer 502 also supports application software, such as a global positioning system (GPS) software application.

The wearable computer 502 also includes voice recognition capability, permitting the user to direct the wearable computer via voice commands. In addition, in some implementations, the wearable computer also includes biometric capability such as facial recognition, retinal scan capability, finger print and voice print capability. The biometric capability permits biometric authentication of the user.

The example camera 504 is a camera that is typically mounted to the headset such that a lens of the camera has a same orientation as the user. When the user looks at an object or a scene, the camera is positioned to record or transmit what the user sees. The optical display 506 provides a display of augmented reality information, as explained later herein. An example of a headset display is a display area of the Google Glass AR device.

When the AR device 102 is used with the display scenario 400, enhanced security may be provided to the customer 204 when entering personal and other information. Typically, if the customer 204 is wearing the AR device, when the customer views section 208 of the dual-use display screen 106, a wireless connection is made between the AR device 102 and a server computer, either server computer 108 or another server computer. When the customer 204 enters the personal or other information into the virtual keyboard display in section 208, the personal or other information that the customer enters is displayed on the optical display 506 of the AR device 102 and is not displayed on the virtual keyboard in section 208. If a person other than the customer 204 views the virtual keyboard display in section 208, the virtual keyboard display appears blank. Having the personal or other information displayed on the AR device 102 and not on the virtual keyboard provides additional privacy and enhanced protection for the personal or other information. In addition, private information from a document, for example a social security number, may be displayed on the AR device 102 but not displayed on either section of the display screen.

Augmented reality may also be used to provide a remote banking application using two display screens, one at a location of a bank or other financial institution and one at a remote location. For example, a customer at home and a banker at a bank can establish a wireless connection and conduct a banking services session remotely. In one example implementation, the customer may have a display screen on a kitchen counter. The display screen on the kitchen counter may connect wirelessly with an AR device that the customer may be wearing. The customer may be able to establish the banking services session with the AR device.

When the session is established, a version of a dual-use screen may be created. In this example, if the banker is in a room with the dual-use display screen 106, the banker may continue to use section 206 of the dual-use display screen 106. The customer uses the display screen at home, on the kitchen counter or at some other location. The banking services session may occur in a manner similar to that previously discussed for the dual-use display screen 106. A document, for example an application for a loan or a mortgage, may be displayed simultaneously on section 206 of the dual-use display screen 106 and on the customer display screen at home. The banker may scroll to a portion of the document and push the document towards section 208 of the dual-use display screen 106. However, this time instead of the portion of the document being displayed on section 208 of the dual-use display screen 106, the portion of the document is displayed on the display screen at home. Any communication between the banker and the customer may be facilitated via the AR device and the established connection.

Figure 6:
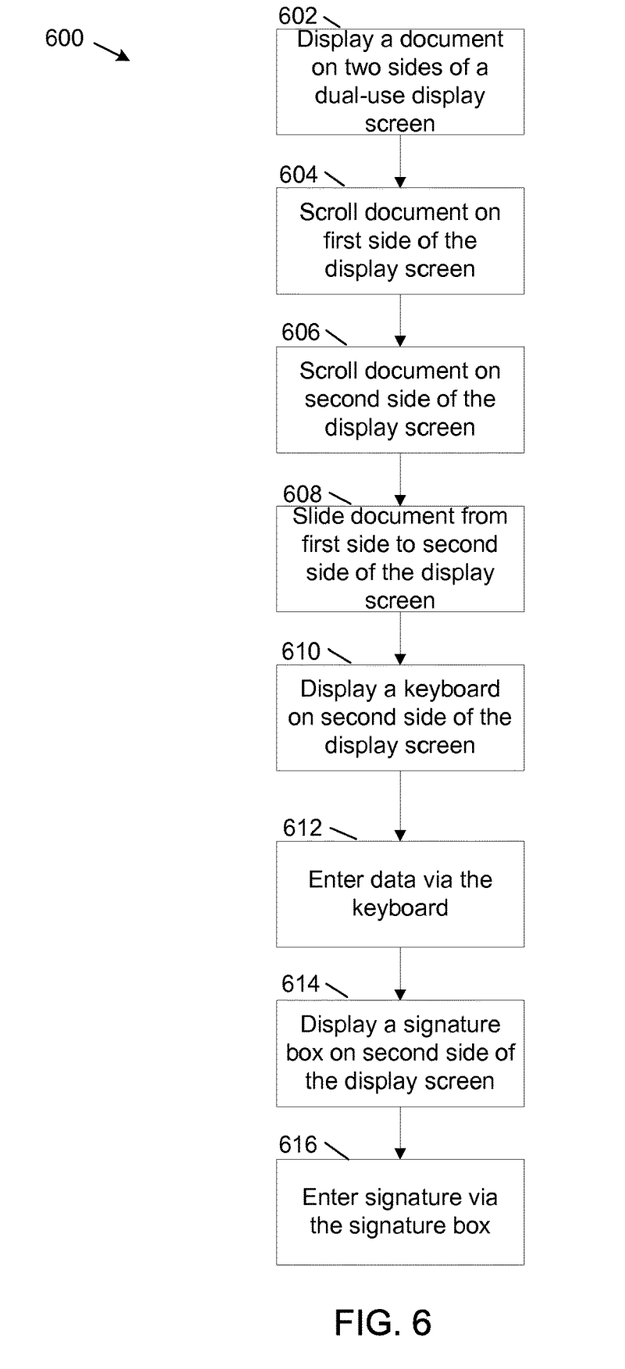
FIG. 6 shows a flowchart for an example method for conducting a banking services session using the dual-use display screen of FIG. 1.

FIG. 6 shows a flowchart of a method 600 for conducting a banking services session using a dual-use screen. The example banking services session may occur at a bank or at offices of another financial institution. In the example banking services session, a customer meets with a banker to initiate an application for a loan. The customer and a banker sit at opposite sides of a table facing each other. A dual-use display screen is mounted on the table. One side of the dual-use display screen, comprising one-half of the display screen, is configured to display text from a document to the banker. The other side of the dual-use display screen, also comprising one-half of the display screen, is configured to display text from the document to the customer. For the example method 600, the dual-use display screen is dual-use display screen 106.

At operation 602, the document is displayed on both sides of dual-use display screen 106. The text of the document on the banker side is oriented to face the banker and the text of the document on the customer side is oriented to face the customer, so that the text displayed to the banker and the text displayed to the customer are oriented to be 180 degrees from each other.

At operation 604, the banker scrolls the document on the banker side of the display screen. Typically, the banker scrolls the document using his/her fingers. As the banker scrolls the document on the banker side of the display screen, the document on the customer side of the display screen is not scrolled. Scrolling on the banker side of the display screen does not affect the display of the document on the customer side of the display screen.

At operation 604, the customer scrolls the document on the customer side of the display screen. As the customer scrolls the document on the customer side of the display screen, the document on the banker side of the display screen is not scrolled.

At operation 608, the banker slides the document from the banker side of the display screen to the customer side of the display screen. When the banker slides the document to the customer side of the display screen, the portion of the document that is displayed on the banker side of the display screen is now displayed on the customer side of the display screen. For example, if the banker scrolled the document so that a text entry area is displayed on the banker side of the display screen, the same portion of the document with the text entry area is now displayed on the customer side of the display screen. The banker side of the display screen does not change when the banker slides the document over to the customer side. As the banker slides the document over to the customer, the orientation of the document changes so that the document faces the customer.

At operation 610, the customer presses the text entry area of the document. For example the text entry area may be a text box in which the customer is required to enter personal information such as name, address, birthdate, social security number, etc. When the customer presses the text box, a virtual keyboard is displayed on the customer side of the document. The customer may enter the personal information required using the virtual keyboard.

At operation 612, the customer enters data into the text box via the virtual keyboard.

At operation 614, a signature box is displayed on the customer side of the display screen. Depending on the document, the customer may have to scroll the document in order to display the signature box.

At operation 616, the customer enters the signature via the signature box. In some implementations, an electronic signature is required, in which case a virtual keyboard is displayed when the customer presses the signature box. In other implementations, a cursive written signature is required. The customer may enter the cursive signature with his/her fingers or with a stylus.

Figure 7:
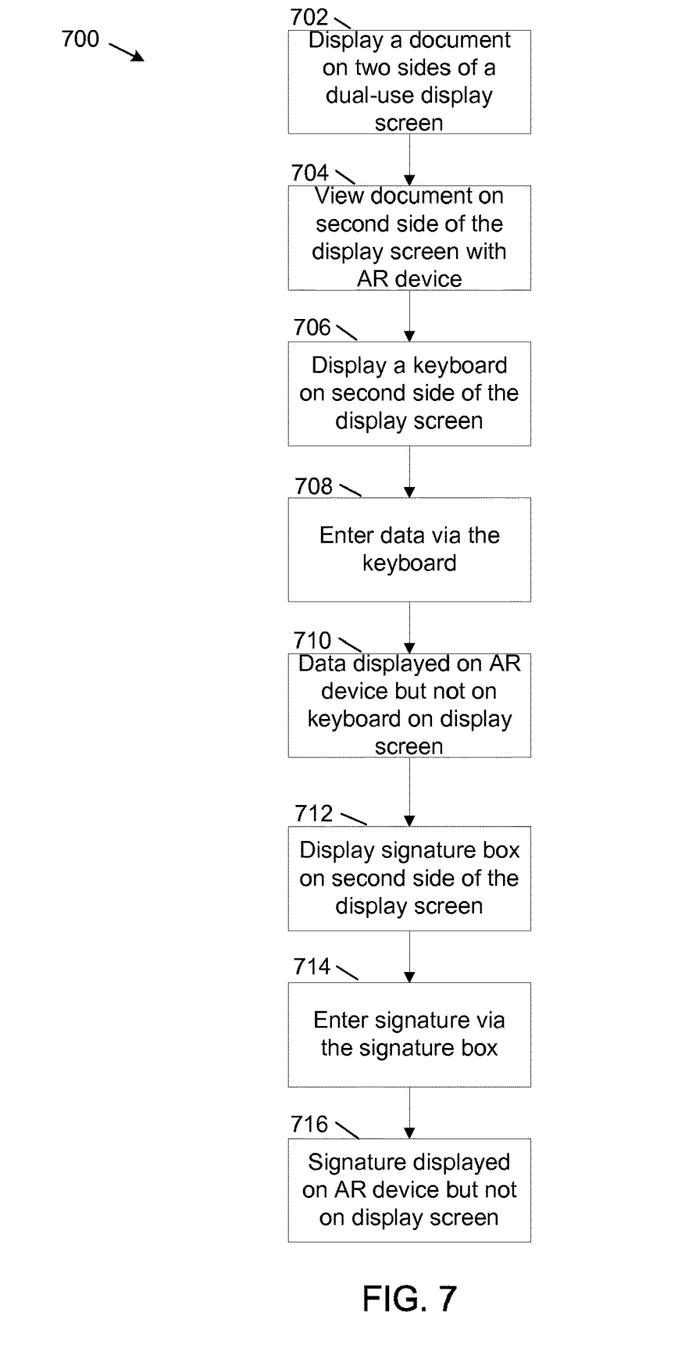
FIG. 7 shows a flowchart of an example method for conducting a banking services session using the dual-use display screen and the AR device of FIG. 1.

FIG. 7 shows a flowchart of a method 700 for conducting a banking services session using a dual-use screen and an AR device. In the example banking services session, a customer meets with a banker to initiate an application for a mortgage. The customer and a banker sit on opposite sides of a table facing each other. A dual-use display screen is installed on the table. One side of the dual-use display screen, comprising one-half of the display screen, is configured to display text from a document to the banker. The other side of the dual-use display screen, also comprising one-half of the display screen, is configured to display text from the document to the customer. The customer uses an AR device, for example Google Glass, and views the document via the AR device.

At operation 702, the document is displayed on both sides of dual-use display screen 106. The text of the document on the banker side is oriented to face the banker and the text of the document on the customer side is oriented to face the customer, so that the text displayed to the banker and the text displayed to the customer are oriented to be 180 degrees from each other.

At operation 704, the customer views the document on the customer side of the display screen using the AR device.

At operation 706, a virtual keyboard is displayed on the customer side of the display screen. In order to display the virtual keyboard, the customer scrolls the document until a text area of the document is displayed and then the customer presses the text area. When the customer presses the text area, the virtual keyboard is displayed.

At operation 708, the customer enters data via the virtual keyboard. The data comprises information requested on the mortgage form such as name, address, social security number, current salary, etc.

At operation 710, the data entered via the virtual keyboard is displayed on the AR device. However, the data is not displayed on the dual-use display screen 106. When the data is displayed on the AR device, only the customer can see the data. This helps to maintain confidentially of the customer's personal information.

At operation 712, a signature box is displayed on the customer side of the display screen. The signature box may be already displayed on the customer side of the display screen or the customer may need to scroll the document to display the signature box.

At operation 714, the customer enters a signature into the signature box. In this example, the customer writes into the signature box with his/her fingers or a stylus. In other implementations, an electronic signature is required, in which case the customer enters an electronic signature via a virtual keyboard. For the method 700, when the customer writes or enters the signature, the signature is displayed on the signature box of the dual-use display screen 106. In other examples, the signature is displayed only on the AR device and is not displayed on the dual-use display screen 106.

Figure 8:
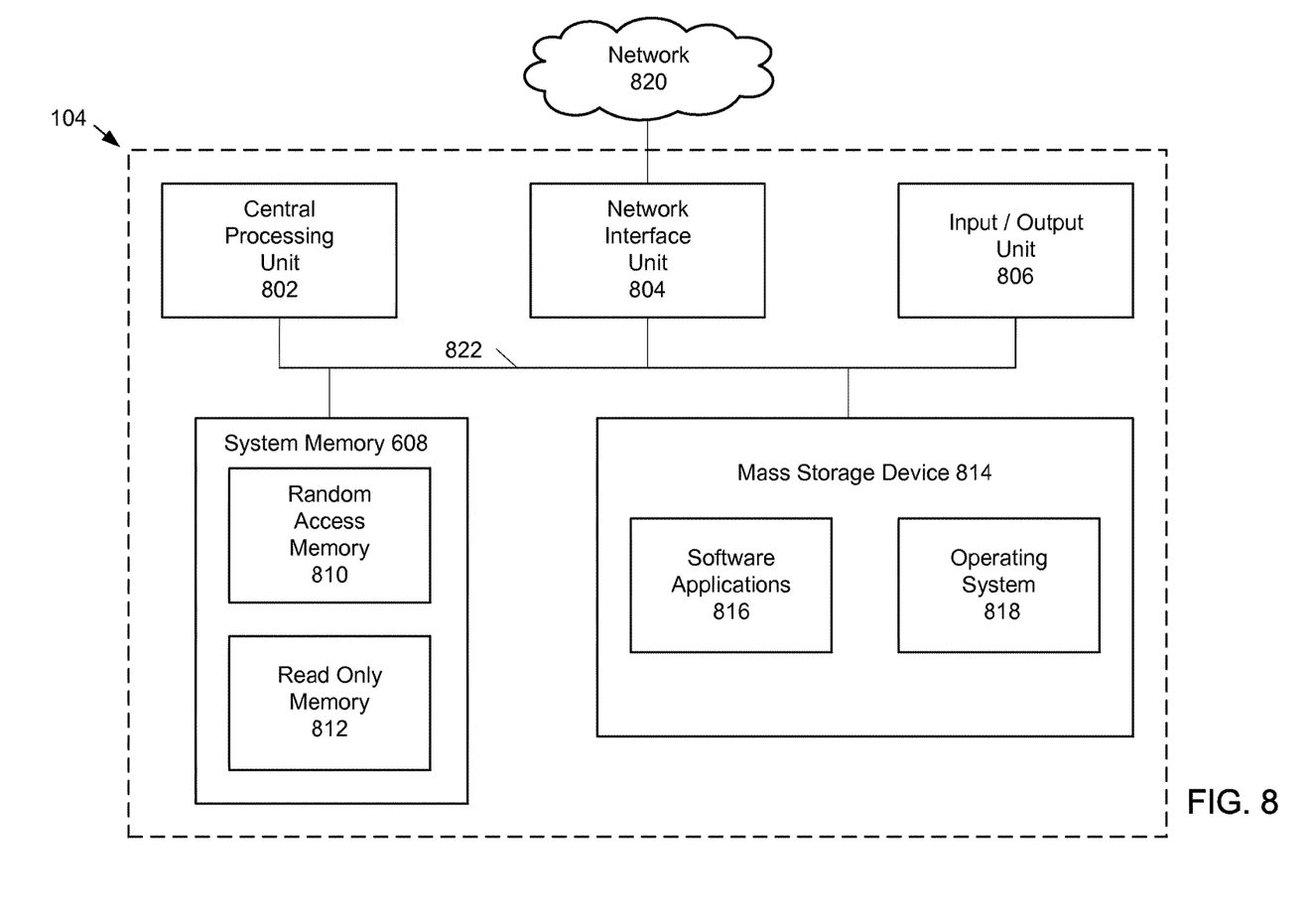
FIG. 8 shows example physical components of the client computer of FIG. 1.

As illustrated in the example of FIG. 8, the client computer 104 of which the dual-use display screen 106 is a part, includes at least one central processing unit ("CPU") 902, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements within the client computer 104, such as during startup, is stored in the ROM 812. The client computer 104 further includes a mass storage device 814. The mass storage device 814 is able to store software instructions and data. A central processing unit, system memory and mass storage device similar to that in FIG. 8 are also included in server computer 108 and in AR device 102.

The mass storage device 814 is connected to the CPU 802 through a mass storage controller (not shown) connected to the system bus 822. The mass storage device 814 and its associated computer-readable data storage media provide non-volatile, non-transitory storage for the client computer 104. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 108.

According to various embodiments of the invention, the client computer 104 may operate in a networked environment using logical connections to remote network devices through the network 820, such as a wireless network, the Internet, or another type of network. The client computer 104 may connect to the network 820 through a network interface unit 804 connected to the system bus 822. It should be appreciated that the network interface unit 804 may also be utilized to connect to other types of networks and remote computing systems. The client computer 104 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the client computer 104 can store software instructions and data. The software instructions include an operating system 818 suitable for controlling the operation of the client computer 104. The mass storage device 814 and/or the RAM 810 also store software instructions, that when executed by the CPU 802, cause the client computer 104 to provide the functionality of the client computer 104 discussed in this document. For example, the mass storage device 814 and/or the RAM 810 can store software instructions that, when executed by the CPU 802, cause the client computer 104 to display received financial data on the display screen of the client computer 104.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on a display screen of an electronic computing device for providing enhanced functionality for displaying one or more documents, the method comprising:

displaying, by the electronic computing device, a financial services document on a first section of the display screen, the display screen comprising two contiguous sections, the first section and a second section, the two contiguous sections being displayed in fixed positions on the display screen;

moving the financial services document on the first section of the display screen towards the second section of the display screen, the financial services document being moved on the first section of the display screen towards the second section of the display screen without changing a position of either the first section or the second section of the display screen;

as a result of moving the financial services document towards the second section of the display screen, displaying the financial services document on the second section of the display screen, while maintaining a display of the financial services document on the first section of the display screen;

performing a first action on the financial services document on the first section of the display screen without changing the display of the financial services document on the second section of the display screen;

performing a second action on the financial services document on the second section of the display screen without changing the display of the financial services document on the first section of the display screen; and performing a third action on the financial services document on the first section of the display screen causing an interaction with the financial services document on the second section of the display screen.

2. The method of claim 1, wherein the first section of the display screen and the second section of the display screen each comprise one half of the display screen.

3. The method of claim 1, wherein a display of the financial services document on the first section of the display screen is oriented 180 degrees from a display of the financial services document on the second section of the display screen.

4. The method of claim 1, wherein performing an action on the financial services document comprises scrolling the financial services document on the display screen.

5. The method of claim 1, wherein performing an action on the financial services document comprises editing the financial services document.

6. The method of claim 1, wherein when the financial services document is displayed on the first section of the display screen but not on the second section of the display screen, advertisements are displayed on the second section of the display screen.

7. The method of claim 1, further comprising:
scrolling the financial services document on the first section of the display screen to a first portion of the financial services document;
receiving a direction to move a display of the financial services document at the first portion of the financial services document to the second section of the display screen; and
changing a display of the financial services document on the second section of the display screen so that the first portion of the financial services document is displayed on the second section of the display screen.

8. The method of claim 1, further comprising displaying a new document on the first section of the display screen and clearing a display on the second section of the display screen so that the new document cannot be viewed on the second section of the display screen.

9. The method of claim 1, further comprising displaying one or more portions of the financial services document on an augmented reality device but not displaying the one or more portions on either the first section of the display screen or the second section of the display screen.

10. The method of claim 1, further comprising displaying a keyboard on the second section of the display screen, wherein the keyboard is not displayed on the first section of the display screen.

11. The method of claim 10, further comprising:
receiving one or more entries from the keyboard at an augmented reality device; and
displaying the one or more entries from the keyboard on the augmented reality device but not displaying any of the entries on either the first section of the display screen or the second section of the display screen.

12. The method of claim 11, further comprising:
receiving at the augmented reality device a signature from a signature box; and
displaying the signature from the signature box on the augmented reality device but not displaying the signature on the second section of the display screen.

13. The method of claim 1, further comprising:
displaying the financial services document on the first section of the display screen but not on the second section of the display screen;
while the financial services document is displayed on the first section of the display screen, displaying the financial services document on a display device at a remote location;
displaying a signature box on the display device at the remote location; and
processing a signature from the signature box at the remote location, the signature being displayed in a signature box on the first section of the display screen.

14. An electronic computing device comprising:
a processing unit; and
a system memory, the system memory including instructions which, when executed by the processing unit, cause the electronic computing device to:
display a financial services document on a first section of a display screen, the display screen comprising two contiguous sections, a first section and a second section, the two contiguous sections being displayed in fixed positions on the display screen;
move the financial services document on the first section of the display screen towards the second section of the display screen, the financial services document being moved on the first section of the display screen towards the second section of the display screen without changing a position of either the first section or the second section of the display screen;
as a result of moving the financial services document towards the second section of the display screen, display the financial services document on the second section of the display screen, while maintaining a display of the financial services document on the first section of the display screen;
perform a first action on the financial services document on the first section of the display screen without changing the display of the financial services document on the second section of the display screen;
perform a second action on the financial services document on the second section of the display screen without changing the display of the financial services document on the first section of the display screen; and
perform a third action on the financial services document on the first section of the display screen causing an interaction with the financial services document on the second section of the display screen.

15. The electronic computing device of claim 14, further comprising:
displaying a keyboard on the second section of the display screen;
receiving entries from the keyboard at an augmented reality device; and
displaying the entries from the keyboard on a display screen of the augmented reality device but not displaying the entries on either the first section of the display screen or the second section of the display screen.

16. The electronic computing device of claim 14, wherein the first section of the display screen and the second section of the display screen each comprise one half of the display screen.

17. The electronic computing device of claim 14, wherein a display of the financial services document on the first section of the display screen is oriented 180 degrees from a display of the financial services document on the second section of the display screen.

18. The electronic computing device of claim 14, wherein performing an action on the financial services document comprises scrolling the financial services document on the display screen.

19. The electronic computing device of claim 14, wherein performing an action on the financial services document comprises editing the financial services document.

20. The electronic computing device of claim 14, further comprising:
   scrolling the financial services document on the first section of the display screen to a first portion of the financial services document;
   receiving a direction to move a display of the financial services document at the first portion of the financial services document to the second section of the display screen; and
   changing a display of the financial services document on the second section of the display screen so that the first portion of the financial services document is displayed on the second section of the display screen.

* * * * *